(12) United States Patent
Chae (10) Patent No.: US 9,746,947 B2
(45) Date of Patent: Aug. 29, 2017

(54) TOUCH PANEL AND DISPLAY DEVICE INCLUDING THE SAME

(71) Applicant: Samsung Display Co., Ltd., Yongin, Gyeonggi-Do (KR)

(72) Inventor: Min Ho Chae, Gwangju (KR)

(73) Assignee: Samsung Display Co., Ltd., Gyeonggi-do (KR)

( * ) Notice: Subject to any disclaimer, the term of this patent is extended or adjusted under 35 U.S.C. 154(b) by 79 days.

(21) Appl. No.: 14/532,946

(22) Filed: Nov. 4, 2014

(65) Prior Publication Data

US 2015/0185892 A1    Jul. 2, 2015

(30) Foreign Application Priority Data

Dec. 27, 2013 (KR) .......................... 10-2013-0166036

(51) Int. Cl.
*G06F 3/041* (2006.01)
*G06F 3/044* (2006.01)

(52) U.S. Cl.
CPC .............. *G06F 3/041* (2013.01); *G06F 3/044* (2013.01); *G06F 3/0412* (2013.01); *G06F 2203/04103* (2013.01); *G06F 2203/04104* (2013.01); *G06F 2203/04106* (2013.01); *G06F 2203/04111* (2013.01)

(58) Field of Classification Search
CPC ................... G06F 3/0412; G06F 3/044; G06F 2203/04103; G06F 2203/04111
See application file for complete search history.

(56) References Cited

U.S. PATENT DOCUMENTS

| | | | |
|---|---|---|---|
| 2003/0137628 A1* | 7/2003 | Nagaoka | G02F 1/1309 349/141 |
| 2004/0119701 A1* | 6/2004 | Mulligan | G06F 3/044 345/173 |
| 2004/0169807 A1* | 9/2004 | Rho | G02F 1/133514 349/139 |

(Continued)

FOREIGN PATENT DOCUMENTS

| KR | 10-2011-0110513 A | 10/2011 |
|---|---|---|
| KR | 10-1073684 B1 | 10/2011 |

(Continued)

*Primary Examiner* — Michael J Eurice
(74) *Attorney, Agent, or Firm* — Knobbe Martens Olson & Bear LLP (57) ABSTRACT

A touch panel and display device including the same are disclosed. In one aspect, the touch panel includes an insulation substrate having a length and a width and a first sensing electrode pattern formed over the insulation substrate and including a plurality of first sensing electrodes and a plurality of first connection portions connecting the first sensing electrodes to each other in a first direction. A second sensing electrode pattern is formed over the insulation substrate and includes a plurality of second sensing electrodes, wherein the first and second sensing electrodes are alternately arranged. The touch panel also includes a plurality of second connection portions substantially overlapping the first connection portions and connecting the second sensing electrodes to each other in a second direction crossing the first direction. The first and second directions are inclined with respect to the length and width of the insulation substrate.

19 Claims, 5 Drawing Sheets

(56) References Cited

U.S. PATENT DOCUMENTS

| | | | |
|---|---|---|---|
| 2005/0088598 A1* | 4/2005 | Matsumori | G02F 1/133553 349/139 |
| 2005/0141048 A1* | 6/2005 | Mizutani | G06K 9/0002 358/474 |
| 2006/0097991 A1* | 5/2006 | Hotelling | G06F 3/0416 345/173 |
| 2007/0085112 A1* | 4/2007 | Yamazaki | H01L 21/28008 257/288 |
| 2008/0062148 A1* | 3/2008 | Hotelling | G02F 1/13338 345/174 |
| 2008/0176046 A1* | 7/2008 | Yamaguchi | B81C 3/008 428/195.1 |
| 2008/0264699 A1* | 10/2008 | Chang | G06F 3/044 178/18.01 |
| 2008/0309634 A1* | 12/2008 | Hotelling | G06F 1/1626 345/173 |
| 2009/0085885 A1* | 4/2009 | Wu | G06F 3/041 345/173 |
| 2009/0135151 A1* | 5/2009 | Sun | G06F 3/041 345/173 |
| 2009/0213090 A1* | 8/2009 | Mamba | G06F 3/044 345/174 |
| 2009/0244028 A1* | 10/2009 | Matsuo | G06F 3/044 345/174 |
| 2010/0171718 A1* | 7/2010 | Denda | G06F 3/044 345/173 |
| 2010/0182275 A1* | 7/2010 | Saitou | G06F 3/044 345/174 |
| 2010/0200286 A1* | 8/2010 | Melcher | G02F 1/155 174/261 |
| 2010/0224424 A1* | 9/2010 | Kasajima | G06F 3/044 178/18.06 |
| 2010/0233930 A1* | 9/2010 | Ishida | G06F 3/0412 445/24 |
| 2010/0261119 A1* | 10/2010 | Li | G06F 3/044 430/319 |
| 2011/0102361 A1* | 5/2011 | Philipp | G06F 3/044 345/174 |
| 2011/0134055 A1* | 6/2011 | Jung | G06F 3/044 345/173 |
| 2011/0193801 A1* | 8/2011 | Jung | G06F 3/0412 345/173 |
| 2011/0227858 A1* | 9/2011 | An | G06F 3/044 345/174 |
| 2011/0298746 A1* | 12/2011 | Hotelling | G06F 3/0418 345/174 |
| 2012/0139871 A1* | 6/2012 | Ku | G06F 3/044 345/174 |
| 2012/0262412 A1* | 10/2012 | Guard | G06F 3/044 345/174 |
| 2012/0298428 A1* | 11/2012 | Lai | G06F 3/044 178/18.06 |
| 2013/0038569 A1* | 2/2013 | Kim | G06F 3/044 345/174 |
| 2013/0082944 A1* | 4/2013 | Juan | G06F 3/044 345/173 |
| 2013/0271689 A1* | 10/2013 | Kim | G02F 1/136209 349/44 |
| 2013/0314626 A1* | 11/2013 | Misaki | G06F 3/044 349/12 |
| 2014/0028925 A1* | 1/2014 | Choi | G02F 1/13338 349/12 |
| 2014/0062912 A1* | 3/2014 | Lien | G06F 3/0412 345/173 |
| 2014/0152685 A1* | 6/2014 | Iwaki | G09G 3/2007 345/589 |
| 2015/0029118 A1* | 1/2015 | Xu | G06F 3/044 345/173 |

FOREIGN PATENT DOCUMENTS

| | | |
|---|---|---|
| KR | 10-1100987 B1 | 12/2011 |
| KR | 10-2012-0018046 A | 2/2012 |
| KR | 10-1128669 B1 | 2/2012 |
| KR | 10-2012-0032737 A | 4/2012 |
| KR | 10-2012-0056033 A | 6/2012 |
| KR | 10-1197701 A | 11/2012 |

* cited by examiner

FIG. 6

TOUCH PANEL AND DISPLAY DEVICE INCLUDING THE SAME

CROSS-REFERENCE TO RELATED APPLICATION

This application claims priority to and the benefit of Korean Patent Application No. 10-2013-0166036 filed in the Korean Intellectual Property Office on Dec. 27, 2013, the entire contents of which are incorporated herein by reference.

BACKGROUND

Field

The described technology generally relates to a touch panel and a display device including the same.

Description of the Related Technology

Flat panel displays (FPDs) such as liquid crystal displays (LCDs), organic light-emitting diode (OLED) displays, and electrophoretic displays (EPDs) include a field generating electrode and an electro-optical active layer. LCDs include a liquid crystal layer as the electro-optical active layer, OLED displays include an organic emission layer as the electro-optical active layer, and EPDs include charged particles. The field generating electrode is connected to a switching element such as a thin film transistor (TFT) to receive a data signal and the electro-optical active layer converts the data signal to an optical signal to display an image.

Flat panel displays including touch functionality are widely used. Such displays enable interaction with a user via touch input in addition to displaying images. A touch sensor is used to detect touch information such as whether an object approaches or touches a screen and the touch location thereof by sensing changes in pressure, charge, light, or the like which are applied to the screen. Typical interactions with a touch sensor include writing text or drawing figures by approaching or touching the screen using a finger or a touch pen. The display device can receive image signals based on the touch information to display an image.

This touch panel can also be used separately from a display device and can be embodied in various forms such as capacitive, resistive, pressure sensitive, and optical touch panels.

SUMMARY OF CERTAIN INVENTIVE ASPECTS

One inventive aspect is a touch panel having low internal resistance so as to consume less power.

Another aspect is a capacitive touch panel that can recognize touch input from relatively small objects.

Another aspect is a touch panel including an insulation substrate, a first sensing electrode pattern formed on the insulation substrate to include a plurality of first sensing electrodes and a first connection part for connecting the first sensing electrodes to each other in a first direction, a second sensing electrode pattern formed between portions at which the first sensing electrode pattern is formed and including a plurality of second sensing electrodes arranged in a second direction that is different from the first direction, and a second connection part configured to insulatively intersect the first connection part and connect the second sensing electrodes to each other, wherein the first direction and the second direction are inclined with respect to a vertical direction or a horizontal direction and are perpendicular to each other, and at least two sides of each of the first sensing electrode and the second sensing electrode are parallel with the first direction or the second direction.

The second connection part may include a pair of second connection parts, each of which connects adjacent ones of the second sensing electrodes to each other.

The first sensing electrode pattern and the second sensing electrode pattern are made of a conductive nanowire or a transparent conductive material.

The second connection part may include a metal.

The first connection part may be extended in the first direction and the second connection part may be extended in the second direction.

The width of the first connection part may be greater than the total width of the pair of second connection parts.

The touch panel may further include an interlayer insulating layer configured to insulatively intersect the second connection part with the first connection part.

The interlayer insulating layer may cover the first connection part and partially cover the adjacent second sensing electrode.

The interlayer insulating layer may cover the first sensing electrode pattern and the second sensing electrode pattern and may have a contact hole for partially exposing the second sensing electrode.

Another aspect is a display device including a display panel, and a touch panel provided on a front surface of the display panel, wherein the insulation substrate includes a first sensing electrode pattern formed on the insulation substrate to include a plurality of first sensing electrodes and a first connection part for connecting the first sensing electrodes to each other in a first direction, a second sensing electrode pattern formed between portions at which the first sensing electrode pattern is formed and including a plurality of second sensing electrodes arranged in a second direction that is different from the first direction, and a second connection part configured to insulatively intersect the first connection part and connect the second sensing electrodes to each other, wherein the first direction and the second direction are inclined with respect to a vertical direction or a horizontal direction and are perpendicular to each other, and at least two sides of each of the first sensing electrode and the second sensing electrode are parallel with the first direction or the second direction.

The second connection part may include a pair of second connection parts, each of which connects adjacent ones of the second sensing electrodes to each other.

The first sensing electrode pattern and the second sensing electrode pattern may be made of a conductive nanowire or a transparent conductive material.

The second connection part may include a metal.

The first connection part may be extended in the first direction and the second connection part may be extended in the second direction.

The width of the first connection part may be greater than the total width of the pair of second connection parts.

The display device may further include an interlayer insulating layer configured to insulatively intersect the second connection part with the first connection part.

The interlayer insulating layer may cover the first connection part and partially cover the adjacent second sensing electrode.

The interlayer insulating layer may cover the first sensing electrode pattern and the second sensing electrode pattern and may have a contact hole for partially exposing the second sensing electrode.

Another aspect is a touch panel including an insulation substrate having an area, a first sensing electrode pattern formed over the insulation substrate and including a plurality of first sensing electrodes and a plurality of first connection portions connecting the first sensing electrodes to each other in a first direction, a second sensing electrode pattern formed over the insulation substrate and including a plurality of second sensing electrodes, wherein the first and second sensing electrodes are alternately arranged, and a plurality of second connection portions substantially overlapping the first connection portions and connecting the second sensing electrodes to each other in a second direction crossing the first direction, wherein the second connection portions are electrically insulated from the first connection portions and wherein the first and second directions are inclined with respect to the area dimensions of the insulation substrate.

The second connection portions are grouped into pairs and wherein each of the pairs of second connection portions connects two of the second sensing electrodes that are adjacent to each other. The first and second sensing electrode patterns are formed of a conductive nanowire or a transparent conductive material. Each of the second connection portions is formed of metal. Each of the first connection portions extends in the first direction and each of the second connection portions extends in the second direction. The width of each of the first connection portions measured in the second direction is greater than the sum of the widths of each of the pairs of second connection portions measured in the first direction. The touch panel further includes an interlayer insulating layer electrically insulating the second connection portions from the first connection portions. The interlayer insulating layer covers each of the first connection portions and partially covers the second sensing electrodes. The interlayer insulating layer covers the first and second sensing electrode patterns and has a plurality of contact holes formed above the second sensing electrodes. Two sides of each of the first sensing electrodes are substantially parallel to the first direction and wherein two sides of each of the second sensing electrodes are substantially parallel to the second direction.

Another aspect is a display device including a display panel and a touch panel formed over the display plane, wherein the touch panel includes an insulation substrate having a length and a width, a first sensing electrode pattern formed over the insulation substrate and including a plurality of first sensing electrodes and a plurality of first connection portions connecting the first sensing electrodes to each other in a first direction, a second sensing electrode pattern formed over the insulation substrate and including a plurality of second sensing electrodes, wherein the first and second sensing electrodes are alternately arranged, and a plurality of second connection portions substantially overlapping the first connection portions and connecting the second sensing electrodes to each other in a second direction substantially perpendicular to the first direction, wherein the second connection portions are electrically insulated from the first connection portions and wherein the first and second directions are inclined with respect to the length and width of the insulation substrate.

The second connection portions are grouped into pairs and wherein each of the pairs of second connection portions electrically connects two of the second sensing electrodes that are adjacent to each other. The first and second sensing electrode patterns are formed of a conductive nanowire or a transparent conductive material. Each of the second connection portions is formed of metal. Each of the first connection portions extends in the first direction and wherein each of the second connection portions extends in the second direction. The width of each of the first connection part is larger portions is greater than a total the sum of the widths of each of the pairs of second connection portions. The display device further includes an interlayer insulating layer electrically insulating the second connection portions from the first connection portions. The interlayer insulating layer covers each of the first connection portions and partially covers the second sensing electrodes. The interlayer insulating layer covers the first and second sensing electrode patterns and has a plurality of contact holes formed above the second sensing electrodes.

Another aspect is a display device including a display panel and a touch panel formed over the display panel, wherein the touch panel includes a substrate, a plurality of first electrodes formed over the substrate, a plurality of first connection portions electrically connecting the first electrodes, wherein each of the first connection portions has a substantially rectangular shape and first and second sides opposing each other and wherein each of the first connection portions is connected to two of the first electrodes, a plurality of second electrodes formed over the substrate and alternately arranged with the first electrodes, and a plurality of second connection portions connecting the second electrodes, wherein each of the first and second electrodes has a substantially rectangular shape and wherein the first side of each of the first connection portions is substantially aligned with a side of one of the two the first electrodes connected thereto and the second side of each of the first connection portions is substantially aligned with a side of the other first electrode connected thereto.

The second connection portions are grouped into pairs and wherein each of the pairs of second connection portions electrically connects two of the second sensing electrodes that are adjacent to each other. The width of each of the first connection portions is greater than the sum of the widths of each of the pairs of second connection portions.

According to at least one embodiment, it is possible to reduce power consumption by decreasing the resistance of a connection part for connecting adjacent sensing electrodes to each other. Further, it is possible to increase the area which can sense touch input and thus sense touch input from smaller objects by reducing the empty space between adjacent sensing electrodes and connection parts, particularly in the region in which the connection part is formed.

DETAILED DESCRIPTION OF CERTAIN INVENTIVE EMBODIMENTS

Capacitive touch panels are the most common type of touch panel. However, they can generate operational errors due to parasitic capacitance and resistance generated at the intersections between electrode patterns. They also typically have relatively high power consumption.

The standard capacitive touch panels sense touch input from objects having a minimum size such as from a finger of a user. Thus, touch input can be sensed even when the distance between adjacent sensing electrodes is relatively wide. However, it is difficult to recognize touch input from relatively small objects using such a touch panel due to the spacing between the sensing electrodes.

Hereinafter, exemplary embodiments will be described in detail with reference to the attached drawings such that the described technology can be easily put into practice by those skilled in the art. As those skilled in the art would realize, the described embodiments may be modified in various different ways, all without departing from the spirit or scope of the described technology.

In the drawings, the thicknesses of layers, films, panels, regions, etc., may be exaggerated for the sake of clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present. The term "substantially" as used in this disclosure means completely, almost completely, or to any significant degree. As used herein, the terms "connected" and "connecting" include "electrically connected" and "electrically connecting."

Hereinafter, a touch panel in accordance with an exemplary embodiment will be described in detail with reference to FIG. 1 and FIG. 2.

Figure 1:
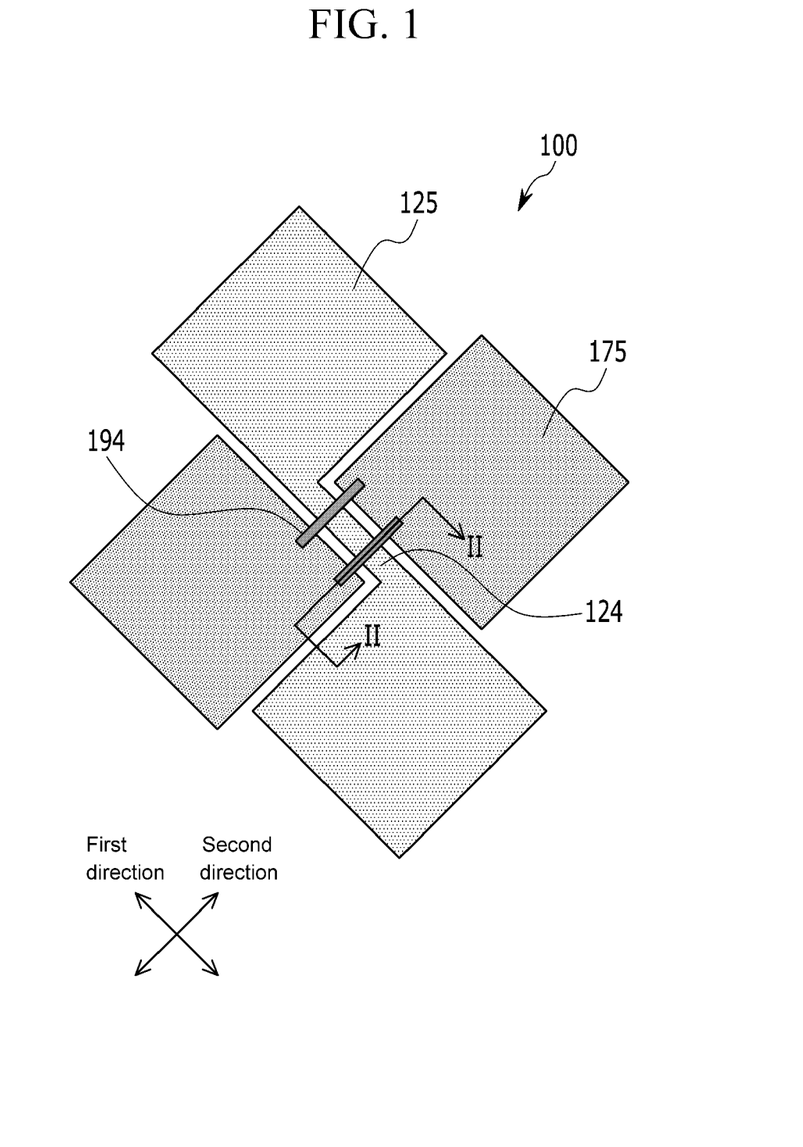
FIG. 1 is a layout view showing a touch panel in accordance with an exemplary embodiment.
Figure 2:
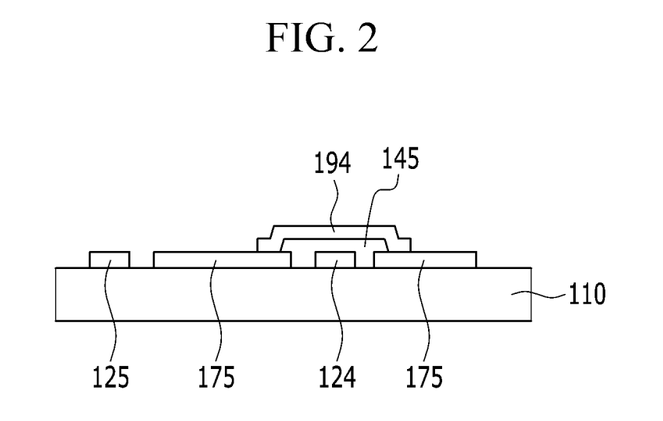
FIG. 2 is a cross-sectional view taken along line II-II of FIG. 1 in accordance with an exemplary embodiment.

Referring to FIG. 1 and FIG. 2, the touch panel 100 includes a first sensing electrode pattern formed on an insulation substrate 110 and including first sensing electrodes 125 extending in a first direction that is inclined with respect to a vertical direction. The touch panel 100 also includes a second sensing electrode pattern including second sensing electrodes 175 extending in a second direction that is substantially perpendicular to the first direction and is inclined with respect to a horizontal direction. The touch panel 100 is typically viewed as shown in FIG. 1, with the vertical and horizontal directions substantially aligned according to the orientation illustrated in the figure. Accordingly, the touch panel has a length in a vertical direction and a width in a horizontal direction and the first and second directions are respectively inclined with respect to the vertical and horizontal directions.

The first sensing electrode pattern includes the first sensing electrodes 125 and a first connection part or first connection portion 124 extending in the first direction to electrically connect the first sensing electrodes 125 to each other. Specifically, the first connection part 124 is formed to electrically connect two adjacent first sensing electrodes 125 to each other and the first connection part 124 and the first sensing electrodes 125 are formed on the same layer with the same material. The first connection part 124 has a linear structure and extends in the first direction. The two first sensing electrodes 125 connected to the first connection part 124 are located on opposing sides of the first connection part 124 with respect to a line extending through the first connection part 124 (an extension line in the first direction). Two sides of the first connection part 124 are substantially parallel to the extension line and two sides of the first sensing electrodes 125 are also substantially parallel to the extension line.

According to some embodiments, the first sensing electrode pattern is formed of a conductive nanowire (e.g., a silver (Ag) nanowire (AgNW)) or a transparent conductive material (e.g., ITO, IZO, or the like).

The first sensing electrode pattern is illustrated as including two first sensing electrodes 125 in FIG. 1, but it may include various numbers of first sensing electrodes 125 depending on the size of the touch panel 100. The first connection part 124 is formed to electrically connect two adjacent first sensing electrodes 125 to each other.

The second sensing electrode pattern includes the plurality of second sensing electrodes 175. The second sensing electrodes 175 are formed in the same layer as the first sensing electrodes 125 and the first connection part 124 with the same material. According to some embodiments, the second sensing electrodes 175 are also formed of a conductive nanowire (e.g., a silver (Ag) nanowire (AgNW)) or a transparent conductive material (e.g., ITO, IZO, or the like).

The second sensing electrodes 175 are formed in gaps of the first sensing electrode pattern and are electrically separated from each other. In particular, the second sensing electrodes 175 are alternately arranged with the first sensing electrodes 125 as shown in FIG. 1. Thus, the first and second sensing patterns are alternately arranged, e.g., in some embodiments, like the red and black squares of a checkerboard. Adjacent sides of the first and second sensing electrodes 125 and 175 are substantially parallel to each other. Two sides of the second sensing electrodes 175 are substantially parallel to the second direction and the remaining sides thereof are substantially parallel to the first direction. Each of the first sensing electrodes 125 has sides that are substantially parallel to the second direction.

As shown in FIG. 1, the second sensing electrodes 175 are arranged adjacent to the first connection part 124. Accordingly, the first and second sensing electrodes 125 and 175 and the first connection part 124 fill substantially the entire layer, thereby increasing the spatial efficiency of the patterns. As a result, even when touch input is received from a small touch pen, it is possible to sense the touch location. In other words, even though it is difficult to sense touch inputs in areas where no sensing electrodes are formed, according to at least one embodiment, substantially all touch input can be sensed by providing the electrodes on substantially the entire area of the touch panel 100.

Two second sensing electrodes 175 are illustrated in FIG. 1, but various numbers of second sensing electrodes 175 may be provided depending on the size of the touch panel 100.

An interlayer insulating layer 145 is formed on the first sensing electrode pattern and the second sensing electrode pattern. As shown in FIG. 2, the interlayer insulating layer 145 partially covers the second sensing electrodes 175 and fully covers the first connection part 124. Alternatively, in other embodiments, the interlayer insulating layer 145 partially covers the first connection part 124. As a result, in the FIG. 2 embodiment, the interlayer insulating layer 145 is formed at a peripheral portion of the first connection part 124.

In some embodiments, the interlayer insulating layer 145 is formed of an inorganic insulating film such as a nitride film or an oxide film, or an organic insulating film including an organic material.

A pair of second connection parts or second connection portions 194 are formed on the interlayer insulating layer 145 and the second sensing electrodes 175. The two adjacent second sensing electrodes 175 are electrically connected to each other by the pair of second connection parts 194.

Opposing ends of each of the second connection parts 194 are respectively connected to the two second sensing electrodes 175 and the majority of the second connection parts 194 are formed on the interlayer insulating layer 145. In some embodiments, the second connection parts 194 are formed in the second direction that is substantially perpendicular to the first connection part 124. The width of each of the second connection parts 194 is less than that of the first connection part 124 and, in some embodiments, the sum of the widths of the pair of second connection parts 194 is less than that of the first connection part 124.

In some embodiments, the material of the second connection parts 194 has better conductivity and less resistance than that of the first connection part 124 and can contain an opaque metal. As a result, the second connection parts 194 can be formed narrower than the first connection part 124 while ensuring that the resistance of the second connection parts 194 is lower than that of first connection part 124. Accordingly, total resistance of the first connection part 124 through which signals sensed by the first sensing electrodes 125 are transferred can be similar to that of the second connection parts 194 through which signals sensed by the second sensing electrodes 175 are transferred. According to at least one embodiments, the second connection parts 194 are formed in pairs in order to reduce the resistance introduced due to the second connection parts 194 between the second sensing electrodes 175.

As described above, a sensing signal is frequently input into one of a set of the first sensing electrodes 125 and the first connection part 124 and a set of the second sensing electrodes 175 and the second connection parts 194.

Hereinafter, a touch panel in accordance with another exemplary embodiment will be described in detail with reference to FIG. 3.

Figure 3:
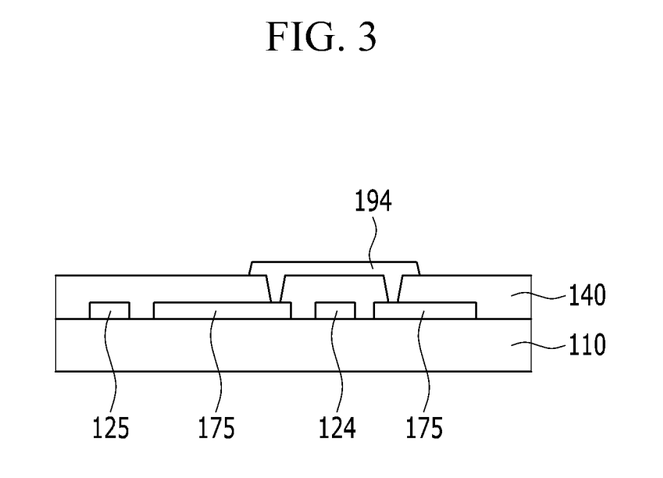
FIG. 3 is a cross-sectional view taken along line II-II of FIG. 1 in accordance with another exemplary embodiment.

In contrast to the touch panel shown in FIG. 2, the touch panel of FIG. 3 has a structure in which the interlayer insulating layer 140 covers the first connection part 124 and the second sensing electrodes 175, and a contact hole is formed to partially expose the second sensing electrodes 175.

Referring to FIG. 1 and FIG. 3, the touch panel 100 includes the first sensing electrode pattern formed on the first insulating substrate 110 and including the first sensing electrodes 125 extending in the first direction that is inclined with respect to the vertical direction. The touch panel 100 also includes the second sensing electrode pattern including the second sensing electrodes 175 extending in the second direction that is substantially perpendicular to the first direction and is inclined with respect to the horizontal direction.

The first sensing electrode pattern includes the plurality of first sensing electrodes 125 and the first connection part 124 extending in the first direction to electrically connect the first sensing electrodes 125 to each other. Specifically, the first connection part 124 is formed to electrically connect two adjacent first sensing electrodes 125 to each other and the first connection part 124 and the first sensing electrodes 125 are formed on the same layer with the same material. The first connection part 124 has a linear structure and extends in the first direction. The two first sensing electrodes 125 electrically connected to the first connection part 124 are located on opposing sides of the first connection part 124 with respect to a line extending through the first connection part 124 (an extension line in the first direction). Two sides of the first connection part 124 are substantially parallel to the extension line and two sides of the first sensing electrodes 125 are also substantially parallel to the extension line.

According to some embodiments, the first sensing electrode pattern is formed of a conductive nanowire (e.g., a silver (Ag) nanowire (AgNW)) or a transparent conductive material (e.g., ITO, IZO, or the like).

The first sensing electrode pattern is illustrated as including two first sensing electrodes 125 in FIG. 1, but may include various numbers of first sensing electrodes 125 depending on the size of the touch panel 100. The first connection part 124 is formed to electrically connect two adjacent first sensing electrodes 125 to each other.

The second sensing electrode pattern includes the plurality of second sensing electrodes 175. The second sensing electrodes 175 are formed on the same layer as the first sensing electrodes 125 and the first connection part 124 with the same material thereof. According to some embodiments, the second sensing electrodes 175 are also formed of a conductive nanowire (e.g., a silver (Ag) nanowire (AgNW)) or a transparent conductive material (e.g., ITO, IZO, or the like).

The second sensing electrodes 175 are formed in gapes of the first sensing electrode pattern and are electrically separated from each other. Adjacent sides of the first and second sensing electrodes 125 and 175 are substantially parallel to each other. Two sides of the second sensing electrodes 175 are substantially parallel to the second direction and the remaining sides thereof are substantially parallel to the first direction. Each of the first sensing electrodes 125 has sides that are substantially parallel to the second direction.

As shown in FIG. 1, the second sensing electrodes 175 are arranged adjacent to the first connection part 124. Accordingly, the first and second sensing electrodes 125 and 175 and the first connection part 124 fill substantially the entire layer, thereby increasing the spatial efficiency of the patterns. As a result, even when touch input is received from a small touch pen, it is possible to sense the touch location. In other words, even though it is difficult to sense touch input in areas where no sensing electrodes are formed, according to at least one embodiment, substantially all touch inputs can be sensed by providing the electrodes on substantially the entire area of the touch panel 100.

Two second sensing electrodes 175 are illustrated in FIG. 1, but various numbers of second sensing electrodes 175 may be provided depending on the size of the touch panel 100.

As shown in FIG. 3, an interlayer insulating layer 140 is formed on the first and second sensing electrode patterns to cover the first sensing electrode pattern (the first sensing electrodes 125 and the first connection part 124) and the second sensing electrode pattern (the second sensing electrodes 175). As a result, the interlayer insulating layer 140 covers the first connection part 124, the first sensing electrodes 125, and the second sensing electrodes 175, and has a plurality of contact holes exposing the second sensing electrodes 175, as shown in FIG. 3.

In some embodiments, the interlayer insulating layer 140 is formed of an inorganic insulating film such as a nitride film or an oxide film, or an organic insulating film including an organic material.

The pair of second connection parts 194 are formed on the interlayer insulating layer 140 to electrically connect the exposed second sensing electrodes 175 to each other. The two adjacent second sensing electrodes 175 are electrically connected to each other by the pair of second connection parts 194.

Opposing ends of each of the second connection parts 194 are respectively electrically connected to the two second sensing electrodes 175 through the contact holes. The second connection parts 194 may be formed in the second direction that is substantially perpendicular to the first connection part 124. The width of each of the second connection parts 194 is less than that of the first connection part 124 and, in some embodiments, the sum of the widths of the pair of second connection parts 194 is less than that of the first connection part 124.

In some embodiments, the material of the second connection parts 194 has better conductivity and less resistance than that of the first connection part 124 and can contain an opaque metal. As a result, the second connection parts 194 can be formed narrower than the first connection part 124 while ensuring that the resistance of the second connection parts 194 is lower than that of the first connection part 124. Accordingly, total resistance of the first connection part 124 through which signals sensed by the first sensing electrodes 125 are transferred can be similar to that of the second connection parts 194 through which signals sensed by the second sensing electrodes 175 are transferred. According to at least one embodiments, the second connection parts 194 are formed in pairs in order to reduce the resistance introduced due to the second connection parts 194 between the second sensing electrodes 175.

As described above, a sensing signal is frequently input into one of a set of the first sensing electrodes 125 and the first connection part 124 and a set of the second sensing electrodes 175 and the second connection parts 194.

Hereinafter, a touch panel in accordance with a modification to the exemplary embodiment of FIG. 1 will be described with reference to FIG. 4.

Figure 4:
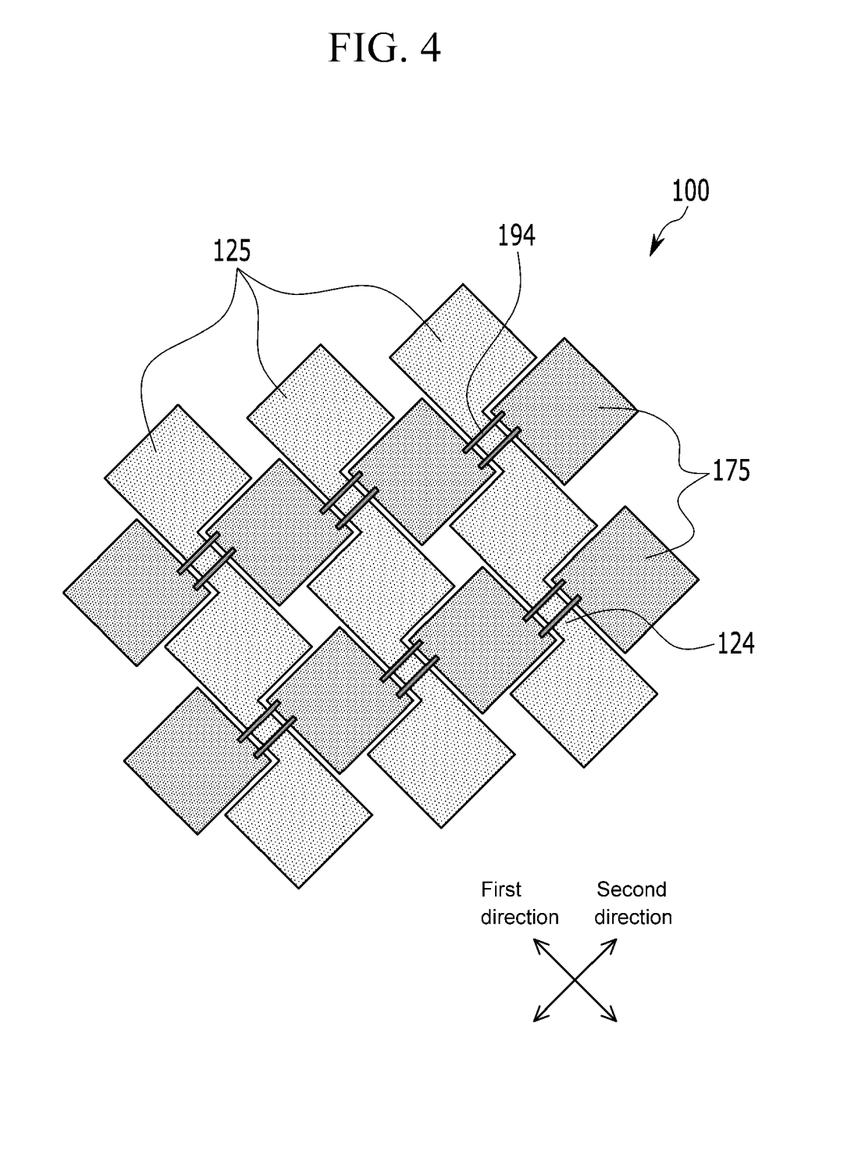
FIG. 4 is a layout view showing a touch panel in accordance with a modification to the exemplary embodiment of FIG. 1.

The width of first connection parts 124 is greater in the FIG. 4 embodiment than in the embodiment of FIG. 1. When the first connection parts 124 are formed of a material having high resistance, the width of the first connection parts 124 where the resistance is the highest is increased in the embodiments of FIG. 4, thereby reducing the total resistance. In other words, the width of the first connection parts 124 can be varied depending on the material of the first connection parts 124 and the total resistance of the first sensing pattern.

Further, in the embodiments of FIG. 4, the pair of second connection parts 194 are formed to reduce the total resistance as compared to when a single second connection part 194 is formed. Depending on the embodiment, three or more second connection parts 194 can be formed as necessary. When that the second connection parts 194 are formed of a non-transparent material such as a metal, they have low resistance, but light cannot pass therethrough. Accordingly, the second connection parts 194 may be visible when a large number of second connection parts are formed. As a result, the number of second connection parts 194 is selected based on the properties of the material used in forming the second connection parts 194 and according to the embodiment.

Hereinafter, a structure of a touch panel that is connected to an external device will be described with reference to FIG. 5.

Figure 5:
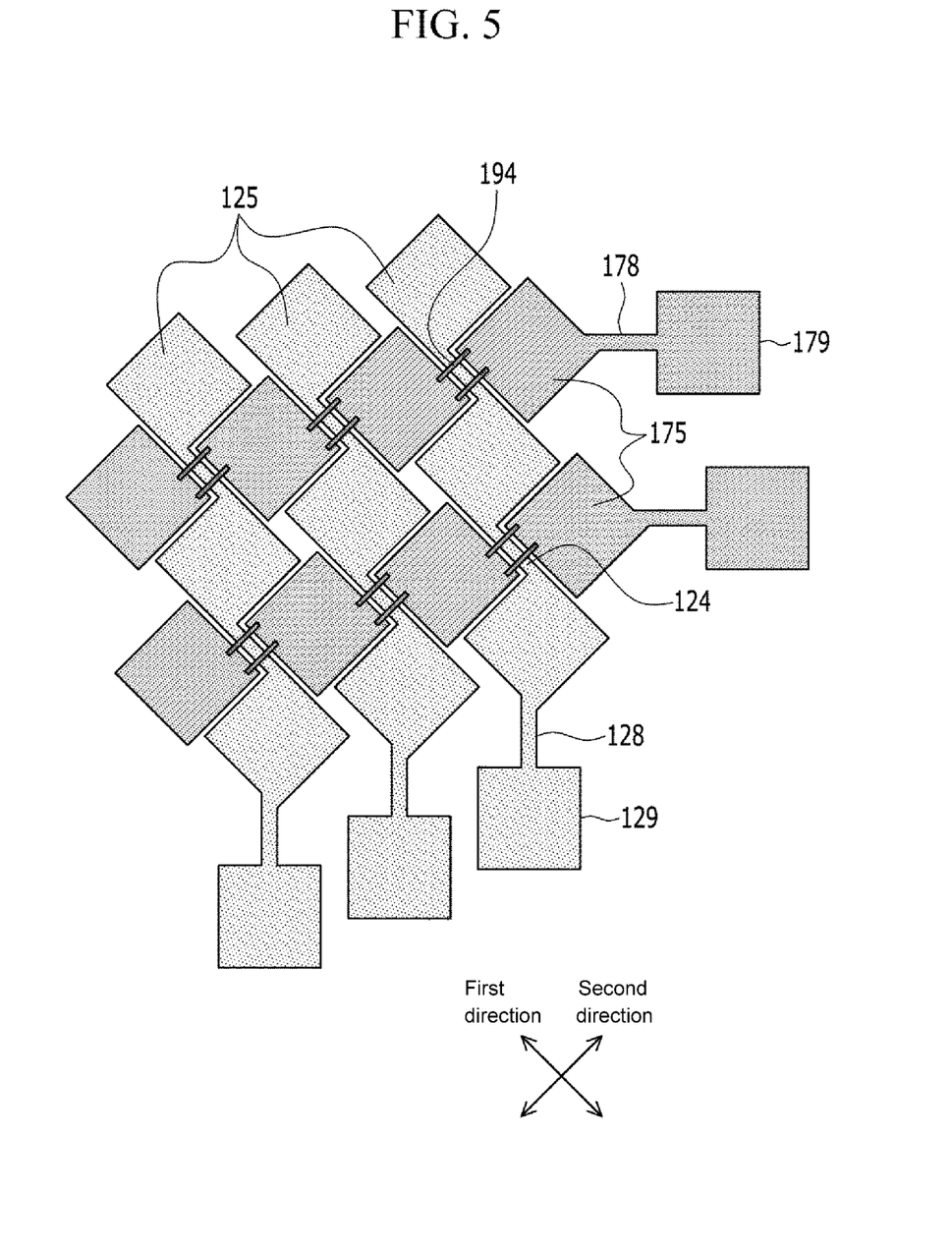
FIG. 5 is a layout view showing a touch panel in accordance with yet another exemplary embodiment.

The touch panel shown in FIG. 5 has a structure further including pads 129 and 179 electrically connected to the external device in addition to the structure shown in FIG. 1.

Specifically, as shown in FIG. 5, a first sensing electrode pattern includes a plurality of first sensing electrodes 125, first connection parts 124 for electrically connecting two adjacent first sensing electrodes 125 to each other, first pads 129 for electrically connecting the first sensing electrode pattern to the external device, and first extension parts 128 for electrically connecting the first pads 129 to the first sensing electrodes 125. The first extension parts 128 and the first pads 129 are formed on the same layer as the first sensing electrodes 125 and the first connection parts 124 with the same material.

A second sensing electrode pattern includes a plurality of second sensing electrodes 175, second connection parts 194 for electrically connecting two adjacent second sensing electrodes 175 to each other, second pads 179 for electrically connecting the second sensing electrode pattern to the external device, and second extension parts 178 for electrically connecting the second pads 179 to the second sensing electrodes 175. The second extension parts 178 and the second pads 179 are formed on the same layer as the second sensing electrodes 175 with the same material.

As a result, the first extension part 128, the first pad 129, the first sensing electrodes 125, the first connection parts 124, the second extension parts 178, the second pads 179, and the second sensing electrodes 175 are formed on the same layer with the same material such as a conductive nanowire (e.g., a silver (Ag) nanowire (AgNW)) or a transparent conductive material (e.g., ITO, IZO, or the like).

Detection signals are input through one of a group of the first pads 129 and a group of the second pads 179 and touch input can be sensed by output a voltage variation according to the detection signals through the other group.

Hereinafter, a schematic structure of a display device in which a touch panel is provided on a front surface of a display panel will be described with reference to FIG. 6.

Figure 6:
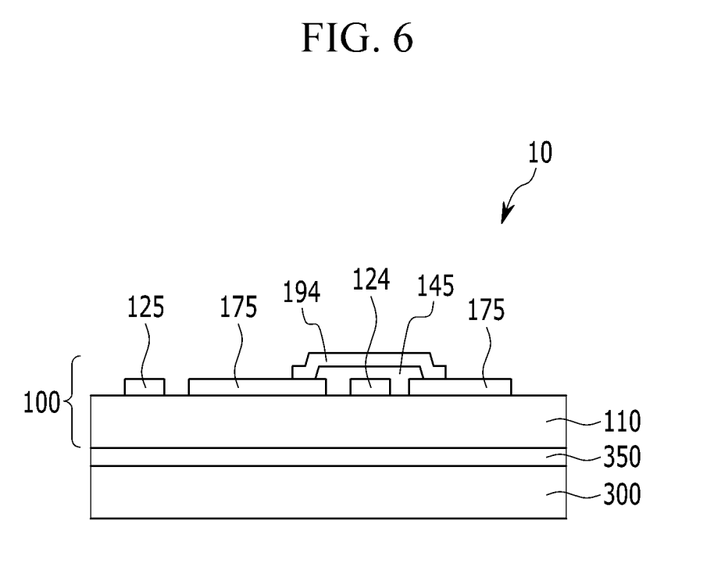
FIG. 6 is a cross-sectional view showing a display device in which a touch panel is provided on a front surface of a display panel in accordance with an exemplary embodiment.

The display device 10 shown in FIG. 6 includes the touch panel 100 and the display panel 300. The touch panel 100 and the display panel 300 are attached to each other via an adhesive 350. According to some embodiments, the touch panel 100 and the display panel 300 share a single insulation substrate and the touch panel 100 is formed on a top surface of the insulation substrate and the display panel 300 is formed below a bottom surface thereof.

Depending on the embodiment, the display panel 300 can be implemented as a flat display panel such as a liquid crystal display (LCD) panel, an organic light-emitting diode (OLED) display panel, an electrophoretic display (EPD) panel, an electrowetting display panel, or a plasma display panel.

The touch panel 100 shown in FIG. 6 has the same structure as shown in FIG. 2, but may have various structures other than the structure shown in FIG. 2.

While the inventive technology has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A touch panel, comprising:
an insulation substrate having an area;
a first sensing electrode pattern formed over the insulation substrate and including i) a plurality of first sensing electrodes and ii) a plurality of first connection portions connecting the first sensing electrodes to each other in a first direction;
a second sensing electrode pattern formed over the insulation substrate and including a plurality of second sensing electrodes, wherein the first and second sensing electrodes are alternately arranged; and
a plurality of second connection portions substantially overlapping the first connection portions and connecting the second sensing electrodes to each other in a second direction crossing the first direction,
wherein the second connection portions are electrically insulated from the first connection portions,
wherein the first and second directions are inclined with respect to the area dimensions of the insulation substrate,
wherein each of the first connection portions is interposed between two adjacent second sensing electrodes,
wherein each of the first connection portions has two sides parallel to a length direction of the first connection portions, and
wherein one of the two sides of each of the first connection portions forms a first continuous straight line with one side of one of two adjacent first sensing electrodes, and the other of the two sides of each of the first connection portions forms a second continuous straight line with one side of the other of the two adjacent first sensing electrodes so as to increase spatial efficiency of the first and second electrode patterns.

2. The touch panel of claim 1, wherein the two sides of each of the first sensing electrodes are substantially parallel to the first direction and wherein another two sides of each of the second sensing electrodes are substantially parallel to the second direction.

3. The touch panel of claim 1, further comprising an interlayer insulating layer electrically insulating the second connection portions from the first connection portions.

4. The touch panel of claim 3, wherein the interlayer insulating layer covers each of the first connection portions and partially covers the second sensing electrodes.

5. The touch panel of claim 3, wherein the interlayer insulating layer covers the first and second sensing electrode patterns and has a plurality of contact holes formed above the second sensing electrodes.

6. The touch panel of claim 1, wherein the second connection portions are grouped into pairs and wherein each of the pairs of second connection portions connects two of the second sensing electrodes that are adjacent to each other.

7. The touch panel of claim 6, wherein each of the first connection portions extends in the first direction and wherein each of the second connection portions extends in the second direction.

8. The touch panel of claim 6, wherein the width of each of the first connection portions measured in the second direction is greater than the sum of the widths of each of the pairs of second connection portions measured in the first direction.

9. The touch panel of claim 6, wherein the first and second sensing electrode patterns are formed of a conductive nanowire or a transparent conductive material.

10. The touch panel of claim 9, wherein each of the second connection portions is formed of metal.

11. A display device, comprising:
a display panel; and
a touch panel formed over the display panel,
wherein the touch panel includes:
an insulation substrate having a length and a width;
a first sensing electrode pattern formed over the insulation substrate and including i) a plurality of first sensing electrodes and ii) a plurality of first connection portions connecting the first sensing electrodes to each other in a first direction;
a second sensing electrode pattern formed over the insulation substrate and including a plurality of second sensing electrodes, wherein the first and second sensing electrodes are alternately arranged; and
a plurality of second connection portions substantially overlapping the first connection portions and connecting the second sensing electrodes to each other in a second direction substantially perpendicular to the first direction,
wherein the second connection portions are electrically insulated from the first connection portions,
wherein the first and second directions are inclined with respect to the length and width of the insulation substrate, and
wherein each of the first connection portions is interposed between two adjacent second sensing electrodes,
wherein each of the first connection portions has two sides parallel to a length direction of the first connection portions, and
wherein one of the two sides of each of the first connection portions forms a first continuous straight line with one side of one of two adjacent first sensing electrodes, and the other of the two sides of each of the first connection portions forms a second continuous straight line with one side of the other of the two adjacent first sensing electrodes so as to increase spatial efficiency of the first and second electrode patterns.

12. The display device of claim 11, further comprising an interlayer insulating layer electrically insulating the second connection portions from the first connection portions.

13. The display device of claim 12, wherein the interlayer insulating layer covers each of the first connection portions and partially covers the second sensing electrodes.

14. The display device of claim 12, wherein the interlayer insulating layer covers the first and second sensing electrode patterns and has a plurality of contact holes formed above the second sensing electrodes.

15. The display device of claim 11, wherein the second connection portions are grouped into pairs and wherein each of the pairs of second connection portions electrically connects two of the second sensing electrodes that are adjacent to each other.

16. The display device of claim 15, wherein each of the first connection portions extends in the first direction and wherein each of the second connection portions extends in the second direction.

17. The display device of claim 15, wherein the width of each of the first connection portions is greater than the sum of the widths of each of the pairs of second connection portions.

18. The display device of claim 15, wherein the first and second sensing electrode patterns are formed of a conductive nanowire or a transparent conductive material.

19. The display device of claim 18, wherein each of the second connection portions is formed of metal.

* * * * *